United States Patent
Yakubovitch et al.

(10) Patent No.: US 9,960,861 B2
(45) Date of Patent: May 1, 2018

(54) ANTENNA VIEW BLOCKAGE SCANNER

(71) Applicant: ORBIT COMMUNICATION SYSTEMS LTD., Netanya (IL)

(72) Inventors: Azriel Yakubovitch, Kfar-Yona (IL); Miron Voin, Haifa (IL); Stav Gizunterman, Netanya (IL); Guy Naym, Netanya (IL)

(73) Assignee: ORBIT COMMUNICATION SYSTEMS LTD, Netanya (IL)

(*) Notice: Subject to any disclaimer, the term of this patent is extended or adjusted under 35 U.S.C. 154(b) by 181 days.

(21) Appl. No.: 15/011,686

(22) Filed: Feb. 1, 2016

(65) Prior Publication Data

US 2016/0226602 A1    Aug. 4, 2016

Related U.S. Application Data

(60) Provisional application No. 62/110,548, filed on Feb. 1, 2015.

(51) Int. Cl.
| | |
|---|---|
| *H01Q 23/00* | (2006.01) |
| *H04B 17/10* | (2015.01) |
| *H01Q 13/02* | (2006.01) |
| *H01Q 3/08* | (2006.01) |
| *H04B 17/00* | (2015.01) |
| *H04B 17/318* | (2015.01) |
| *H01Q 1/34* | (2006.01) |
| *H01Q 19/19* | (2006.01) |

(52) U.S. Cl.
CPC ............ *H04B 17/103* (2015.01); *H01Q 1/34* (2013.01); *H01Q 3/08* (2013.01); *H01Q 13/02* (2013.01); *H01Q 19/19* (2013.01); *H04B 17/0085* (2013.01); *H04B 17/101* (2015.01); *H04B 17/318* (2015.01)

(58) Field of Classification Search
CPC ............ H01Q 1/34; H01Q 3/08; H01Q 13/02; H01Q 19/19
USPC ........................................................... 343/703
See application file for complete search history.

(56) References Cited

U.S. PATENT DOCUMENTS

| | | | | |
|---|---|---|---|---|
| 4,280,127 | A * | 7/1981 | Lee ..................... | G01S 13/9035 342/25 A |
| 7,423,604 | B2 * | 9/2008 | Nagai ................ | H01Q 21/0037 343/776 |
| 2011/0140954 | A1 * | 6/2011 | Fortuny-Guasch ..... | G01S 13/32 342/179 |

* cited by examiner

*Primary Examiner* — Graham Smith
(74) *Attorney, Agent, or Firm* — Mark M. Friedman

(57) ABSTRACT

A system for measuring blockage facilitates automated measuring using an installed antenna as a measuring device, providing more accurate and reliable results as compared to conventional methods of measuring blockage. The system eliminates the need for meticulous and tedious manual measurements as well as the time consuming search for structural drawings, necessary to perform conventional blockage measuring. The system features an efficient and accurate way of establishing the angular direction points in which an antenna view is obstructed by recording the obstruction reflections standing out of the clear sky noise floor. Embodiments are particularly useful when installing a satellite communications antenna on a ship having metal structures obstructing the antenna's view such as communication masts, funnels, and smokestacks.

15 Claims, 5 Drawing Sheets

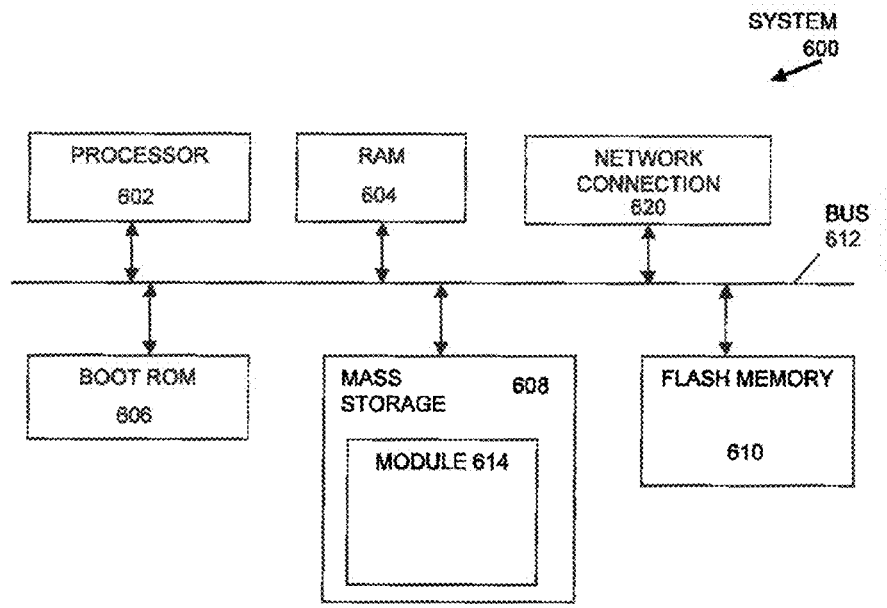

FIGURE 6

| Estimated Signals in Blockage Environment | | | |
|---|---|---|---|
| Considered Parameter | Value | Value | Unit |
| Inputs variable: | Ku-band | Ka-band | |
| Scanning Frequency | 14.50 | 31.00 | [GHz] |
| Rx Reflector Diameter | 2.00 | 2.00 | [m] |
| Tx Horn Aperture Diameter | 0.10 | 0.10 | [m] |
| Tx Horn Output Power | 0.00 | 0.00 | [dBm] |
| Reflector to Blockage Distance | 75.0 | 75.0 | [m] |
| Estimated Blockage Reflectivity | -30.00 | -30.00 | [dB] |
| Calculated Values: | | | |
| Rx reflector Gain | 46.65 | 53.25 | [dB] |
| Rx Reflector Beamwidth | 0.87 | 0.41 | [Δθ°] |
| Tx Horn Gain | 20.63 | 27.23 | [dB] |
| Tx Horn Beamwidth | 17.38 | 8.13 | [Δθ°] |
| Round Path Loss | 99.19 | 105.79 | [dB] |
| Rx Signal Power at LNB Input | -61.91 | -55.31 | [dBm] |

FIGURE 7

ANTENNA VIEW BLOCKAGE SCANNER

CROSS-REFERENCE TO RELATED APPLICATIONS

This application claims the benefit of provisional patent application (PPA) Ser. No. US 62/110,548 filed Feb. 1, 2015 by the present inventors, which is incorporated by reference in its entirety herein.

FIELD OF THE INVENTION

The present invention generally relates to antennas, and in particular, it concerns determining obstructions to the antenna view.

BACKGROUND OF THE INVENTION

Refer to FIG. 1, an exemplary diagram of antenna blockage. In this case, a ship 106 has an installed antenna 100. When the antenna 100 is transmitting or receiving above 0° (zero degrees) elevation (relative to the antenna 100), there are two exemplary blockages, blockage-a 102A and blockage-b 102B. Blockage-a 102A is located toward the stem and blockage-b 102B is toward the bow of the ship 106. Using the ship's bow as a reference for 0° (zero degrees) azimuth, blockage-a 102A has a blockage zone roughly from 165° to 195° azimuth and 0° to 15° elevation, and blockage-b 102B has a blockage zone roughly from 355° to 5° azimuth and 0° to 8° elevation. When the antenna 100 is pointing toward a blockage zone, the antenna may not be able to receive a desired signal, or reception may be highly degraded. Similarly, when the antenna 100 is pointing toward a blockage zone, transmission may not be successful due to interference from the blockage or for safety reasons (of people on board the ship), the antenna may not be allowed to transmit when facing a blockage zone.

Blockages are generally electromagnetically opaque structures. In the current non-limiting example of a ship, blockages include metal structures such as communication masts, funnels, and smokestacks. One or more blockages can result in one or more corresponding blockage zones hindering transmission and reception from and to an associated antenna.

SUMMARY

According to the teachings of the present embodiment there is provided a system for measuring blockage, including: a transmitter horn (Tx horn) configured for transmitting a test signal in a transmitting direction; and an installed antenna configured for receiving a reflection of the test signal from a receiving direction; wherein the Tx horn's transmitting direction is directionally aligned with the receiving direction.

In an optional embodiment, the Tx horn is configured for transmitting the test signal at a power level selected from the group consisting of: 0 dBm (decibel-milliwatts); −10 to 0 dBm; 0 to 4 dBm; 0 to 15 dBm; 0 to 33 dBm; and detectable by a LNB (low noise block) of the installed antenna.

In another optional embodiment, the Tx horn has a beam width selected from the group consisting of: at least 10 degrees; at least 15 degrees; at least 20 degrees; and at least 25 degrees. In another optional embodiment, the installed antenna has a beam width selected from the group consisting of: less than 5 degrees; less than 2 degrees; and less than 1 degree. In another optional embodiment, the Tx horn is standalone from the installed antenna and mounted substantially in the receiving direction.

In another optional embodiment, the directional alignment includes the transmitting direction being substantially parallel to and matched with the azimuth and elevation of the receiving directions. In another optional embodiment, the wherein during the transmitting and prior to the receiving, the installed antenna is calibrated by pointing the installed antenna towards clear sky.

According to the teachings of the present embodiment there is provided a method for measuring blockage, including the steps of: transmitting a test signal from a transmitter horn (Tx horn) in a transmitting direction; and receiving a reflection of the test signal at an installed antenna from a receiving direction; wherein the transmitting direction is directionally aligned with the receiving direction.

In an optional embodiment, the transmitting and receiving is repeated in a scan of azimuth and elevation points relative to the axis of the installed antenna, each of the points having a respective reflection.

In another optional embodiment, the method further includes: comparing each of the respective reflections to a reference signal level, and for any of the points where the respective reflection exceeds the reference signal designating the point as having blockage.

In another optional embodiment, the Tx horn is standalone from the installed antenna and mounted substantially in the receiving direction. In another optional embodiment, the directional alignment includes the transmitting direction being substantially parallel to and matched with the azimuth and elevation of the receiving directions. In another optional embodiment, during the transmitting and prior to the receiving, the installed antenna is calibrated by pointing the installed antenna towards clear sky.

According to the teachings of the present embodiment there is provided a non-transitory computer-readable storage medium having embedded thereon computer-readable code for measuring blockage, the computer-readable code comprising program code for: transmitting a test signal from a transmitter horn (Tx horn) in a transmitting direction; and receiving a reflection of the test signal at an installed antenna from a receiving direction; wherein the transmitting direction is directionally aligned with the receiving direction.

According to the teachings of the present embodiment there is provided a computer program that can be loaded onto a server connected to a network, so that the server running the computer program constitutes a processing system in a system according to the current description.

According to the teachings of the present embodiment there is provided a method for measuring blockage, including the steps of: receiving an incoming signal at an installed antenna, the incoming signal selected from the group consisting of: a clear sky signal; and an obstruction signal, repeating the receiving in a scan of azimuth and elevation points, each of the points having a respective incoming signal power level; and generating, using the power levels, a map of received power.

Another optional embodiment includes the step of: extracting features from the map of received power. Another optional embodiment includes the step of: prior to the extracting, normalizing the map. In another optional embodiment, the extracting is performed using at least one image processing technique. In another optional embodiment, the extracting includes designating points where the power level is less than a provided power level as points having blockage.

According to the teachings of the present embodiment there is provided a non-transitory computer-readable storage medium having embedded thereon computer-readable code for measuring blockage, the computer-readable code comprising program code for: receiving an incoming signal at an installed antenna, the incoming signal selected from the group consisting of a clear sky signal; and an obstruction signal, repeating the receiving in a scan of azimuth and elevation points, each of the points having a respective incoming signal power level; and generating, using the power levels, a map of received power.

BRIEF DESCRIPTION OF FIGURES

The embodiment is herein described, by way of example only, with reference to the accompanying drawings, wherein:

FIG. 6 is a high-level partial block diagram of an exemplary system configured to implement the ACU of the present invention.

FIG. 7, a table of values for an exemplary power analysis.

ABBREVIATIONS AND DEFINITIONS

Figure 1:
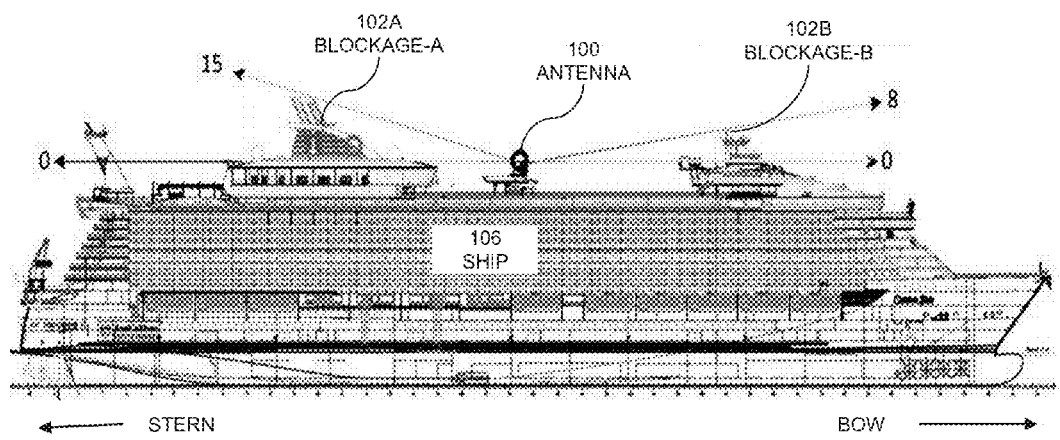
FIG. 1, an exemplary diagram of antenna blockage.

For convenience of reference, this section contains a brief list of abbreviations, acronyms, and short definitions used in this document. This section should not be considered limiting. Fuller descriptions can be found below, and in the applicable Standards.

ACU—Antenna Control Unit
Clear sky—A non-obstructed view to the sky
Horn—Also referred to in the context of this document as a feed, feed horn, horn antenna, and microwave horn, an antenna that can be used alone or in conjunction with (transmit to and receive from) a larger antenna.
L-NBR—L-band narrow band receiver
LNB—Low Noise Block, containing a low noise amplifier (LNA) and a frequency down converter
BUC—Block Up Converter, containing a frequency up converter and a power amplifier
PLL—Phased Locked Loop
Rx—Receive
SMW—Swedish Micro Wave Company
Tx—Transmit

DETAILED DESCRIPTION—FIRST EMBODIMENT—FIGS. 1 TO 7

The principles and operation of the system according to a present embodiment may be better understood with reference to the drawings and the accompanying description. A present invention is a system for measuring blockage. The system facilitates automated measuring using an installed antenna as a measuring device, providing more accurate and reliable results as compared to conventional methods of measuring blockage. The system eliminates the need for meticulous and tedious manual measurements as well as the time consuming search for structural drawings, necessary to perform conventional blockage measuring.

The system features an efficient and accurate way of establishing the angular direction points in which an antenna view is obstructed by one or more electromagnetically opaque structures having a measurable amount of reflectivity. Embodiments are particularly useful when installing a satellite communications antenna on a ship having metal structures obstructing the antenna's view such as communication masts, funnels, and smokestacks. In contrast to conventional methods that measure the optical representation of an electromagnetic obstruction, embodiments of the current method measure directly the electromagnetic obstruction, thus being inherently more accurate.

Conventional methods for measuring the installed antenna angular blockage zones involves a manual process of physically surveying the sight, taking geometrical measurements of the obstructing structures as well as ranges from the structures to the antenna being installed. In most installation cases, direct "yard-stick" measurements are not practical, so a selection of improvised methods such as cell-phone photography is utilized. Alternatively, detailed scaled drawings of the particular installation surroundings may be used. However, detailed scale drawings are seldom available. The fact that both azimuth and elevation dimensions have to be surveyed makes the installation and surveying effort even more complex. In any case, after conventional methods obtain geometrical data, the data has to be manually processed to derive the angular view obstruction points from the antenna perspective. The entire conventional process is time consuming, involving manual trigonometric calculations, depends on availability of existent data, and frequently quite inaccurate compared to the real blockage points and resolution desired for operation of the installed antenna. Conventional methods measure the optical representation of an electromagnetic obstruction, and this representation does not necessarily have a one-to-one correlation with real blockage.

In the context of this document, the terms "blockage" and "blockage zone" are generally used interchangeably to refer to a direction or area where transmission and reception of an antenna are not permitted or significantly degraded from normal antenna operation.

Figure 2:
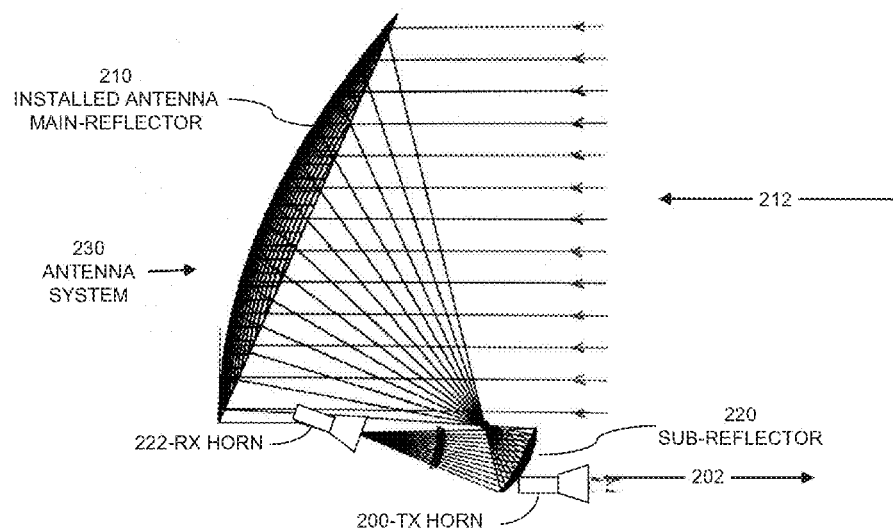
FIG. 2, a diagram of an exemplary system for measuring blockage.

Refer now to FIG. 2, a diagram of an exemplary system for measuring blockage (blockage zones). A transmitter horn (Tx horn) 200 is configured for transmitting a test signal in a transmitting direction 202. An installed antenna 210 is configured for receiving a reflection of the test signal from a receiving direction 212. The Tx horn's transmitting direction 202 is directionally aligned with the receiving direction 212.

Typically, the Tx horn 200 is standalone from the installed antenna 210 (from the antenna system 230) and mounted substantially in the receiving direction 212. The Tx horn 200 is typically a single element. The Tx horn serves as a stand-alone antenna, typically having a very wide beam (e.g. over 20 degrees), and relatively low gain (e.g. typically less than 15 dB). The Tx horn 200 can be mounted onto the antenna system 230. Alternatively, the Tx horn 200 can be mounted in any location providing directional alignment of the Tx horn transmitting direction 202 with the installed antenna (main reflector) 210 receiving direction 212. Generally, the location of the Tx horn can be varied as long as the Tx horn is generally directionally aligned with the main reflector (the receiving direction 212 of the installed antenna 210). The Tx horn is also referred to in the context of this document as a "Tx illuminator", as the Tx horn is used to illuminate structures that create blockage zones for the installed antenna (illuminate the scanned area). "Transmitting direction" is also referred to as "direction of transmitting".

Typically, the installed antenna 210 is a main-reflector portion of an antenna system 230 including a sub-reflector 220 and Rx horn 222. When the Rx horn 222, sub-reflector 220, and main reflector (installed antenna 210) are placed in correct geometric locations, this antenna system 230 creates a high-gain narrow-beam (typically greater than 40 dB gain and less than 2 degrees beam width) antenna for a received signal coming from the receiving direction 212. "Receiving direction" is also referred to as "direction of receiving".

Directional alignment includes the transmitting direction 202 being substantially parallel to, and matched with, the azimuth and elevation of the opposed receiving direction 212. Transmitting and receiving directions can be considered vector directions, so when both directions are substantially parallel, the directions are "pointed the same way", but opposite facing. In other words, the direction of transmission matches the direction of receiving. Namely, the direction of transmission and the direction of receiving face the same target in parallel at opposite directions of each other. As is known in the art, the direction of transmission and receiving of the main reflector when the Rx horn is at the focus of the installed antenna (or the sub-reflector in the case of an antenna system) is along the axis of the installed antenna.

Generally, the transmission signal (test signal from the Tx horn 200) is at a very low power, (on the order of 0 (zero) dBm), in the range of receive frequency of the antenna (antenna system 230) LNB (low noise block), and from a wide-beam horn (e.g. over 20 degrees). The test signal reflected by an obstruction and then received at the LNB (Tx monitoring LNB 312) is typically at a level of −80 to −30 dBm, depending on the size, reflectivity, and range of the obstruction. The transmission signal (power or magnitude of the transmission signal) should be kept at this very low power during operation of the system for reasons including:

The receiving antenna sensitivity (sensitivity of antenna system 230). This antenna system is typically designed to receive signals from a geostationary satellite floating about 36000 km above the Earth surface, so the receive antenna is very sensitive. A strong signal will cause the first antenna receiving gain stage to saturate.

Higher signal strengths (for example, stronger than the signal strength of a cellular phone) may be a safety and health hazard for people who are in the vicinity of the Tx horn during the scanning process (measuring blockage).

Exemplary beam widths for the Tx horn 200 include:
at least 10 degrees,
at least 15 degrees,
at least 20 degrees, and
at least 25 degrees.

Exemplary beam widths for the installed antenna 210 include:
less than 5 degrees;
less than 2 degrees; and
less than 1 degree.

Using a configuration similar to the above-described system, a method for measuring blockage, includes transmitting a test signal from the transmitter horn (Tx horn) 200 in a transmitting direction 202 and receiving a reflection of the test signal at the installed antenna 210 from a receiving direction 212. The transmitting direction 202 is directionally aligned with the receiving direction 212.

While the current method can be used to determine blockage of one or more azimuth and elevation points, for clarity a typically scenario is described where blockage is determined for a plurality of points, typically a multitude of points numbering a few hundreds, in the range of tens to thousands of points.

This method of directionally aligned transmission and reception is preferably repeated in a scan of azimuth and elevation points relative to the installed antenna, each of the points having a respective reflection. The antenna can be systematically moved in a two dimensional (azimuth-elevation) raster scan, recording the transmitted signal reflection. Alternative scan patterns and systems of orientation can be used. The azimuth and elevation can be relative to an axis of the installed antenna 210, or another axis, for example formed by the relative location of the installed antenna 210 in relation to the fore-aft (bow-stem) of a ship. The raster scan is typically complete azimuth 360 degree scan with an elevation raster down to at least 5 degrees. The maximum elevation of the raster scan can be manually configured or automatically determined during the blockage scan, for example, when a 360 azimuth has been scanned, and no reflected signals are detected (received). The fact that the signal reflection (reflection of the test signal) is received by a relatively large reflector antenna (installed antenna 210) having a relatively narrow beam-width, assures good measurement discrimination. Measurement discrimination is defined by the antenna beam-width: for example, good measurement discrimination using a 5 degree beam-width antenna would provide a +/−2.5 degree measurement accuracy whereas a 1 degree beam-width antenna would give +/−0.5 degree.

Each of the respective reflections can be compared to a reference signal level, and for any of the points where the respective reflection exceeds the reference signal, the point is designated as having blockage. The reference signal can be a defined (given) maximal allowed reflection threshold. All values of received reflections with a signal strength (reflection power) greater than the reflection threshold will be treated as a blockage.

Figure 3:
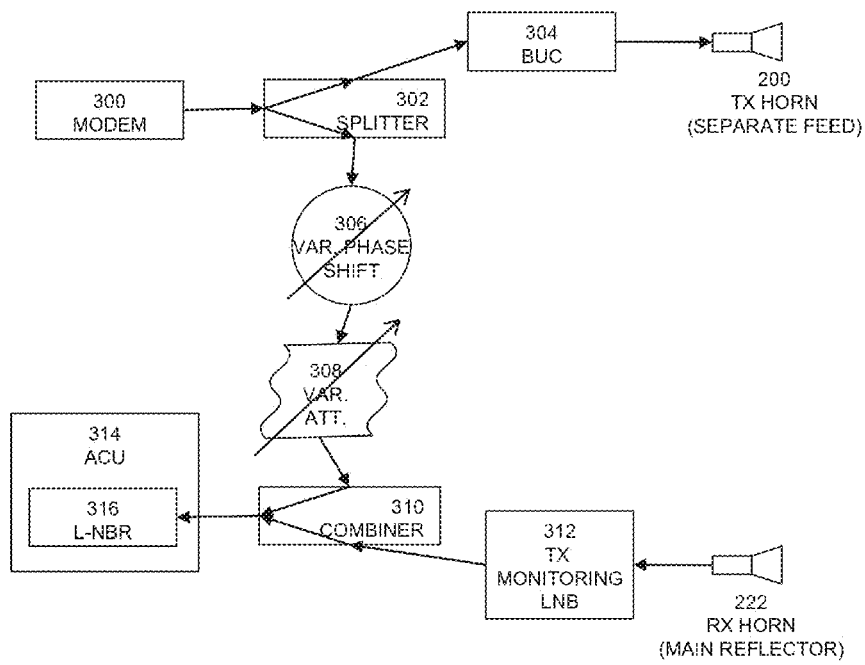
FIG. 3, a diagram of a system for implementing blockage scanning.

Refer now to FIG. 3, a diagram of a system for implementing blockage scanning. A modem 300 generates a signal (Tx signal, signal to be transmitted) that is split in a splitter 302. One of the split signals is sent to a block up converter (BUC) 304 for transfer to Tx horn 200 and transmission as a test signal. Another one of the split signals is sent to a tunable (variable) phase shifter 306 then a variable attenuator 308 before entering a combiner 310. A reflection of the test signal is received by the Rx horn 222 to a Tx monitoring LNB and then enters combiner 310. The output of the combiner 310 is recorded by the antenna control unit (ACU) 314 L-band narrow band receiver (L-NBR) 316. The collected data of reflected signal strength for each azimuth-elevation point is also referred to in the context of this document as blockage scanner data.

Prior to performing a blockage scan (prior to beginning transmission for measuring blockage), the Tx horn 200 can transmit a test signal while the installed antenna 210 is pointed toward clear sky. This helps calibrate the measurement system, in particular assuring that any leakage of the Tx horn 200 transmission of a test signal to the receiving system (Rx horn 222) is cancelled out, and that the measurements expected on the blockage scanner output are measurements caused by signal reflections from actual obstructions (blockages).

Both the Rx horn 222 and Tx horn 200 can be used to both transmit and receive. While determining antenna blockage, the Tx horn 200 is used to transmit and the Rx horn 222 is used to receive. During normal operation of the installed antenna (antenna system), the Tx horn is not used (inoperable) and the Rx horn 222 can be used to both transmit and receive.

The strength (signal strength, power level) of the reflection (received signal, reflection of the test signal) is recorded by the ACU 314, for example using the L-NBR 316. The system, typically the ACU, knows the receiving direction of the installed antenna (and corresponding transmitting direction) so the recorded signal strength can be recorded in association with an azimuth and elevation point.

Figure 4A:
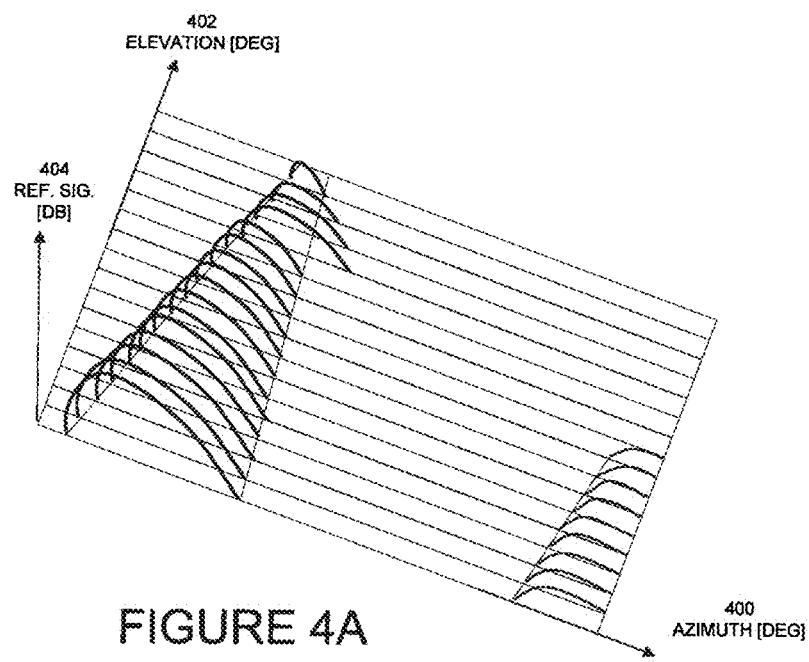
FIG. 4A, a sketch of a 3D image of received signal strength versus azimuth and elevation.

Refer now to FIG. 4A, a sketch of a 3D image of received signal strength versus azimuth and elevation. Azimuth 400 axis is shown in degrees versus elevation 402 axis in degrees. For points on the azimuth-elevation scan, there may be a signal strength above a pre-determined reference threshold level shown on reflected signal 404 axis (received reflection of the test signal) in decibels (dB). The group (collection, set) of points and respective associated reflection signal strengths is collected data that can be used to form a three dimensional (3D) image of the environment of the installed antenna 210. In other words, a 3D vector with azimuth, elevation, and blockage can be created. When reconstructing the scanned information (for example, from an azimuth-elevation raster scan) on a graph, a 3D image is created, namely—reflected signal strength as the measured variating parameter depending on the two reference coordinates: Azimuth and Elevation angles. This 3D image can be used to indicate where blockages are from obstructions surrounding the installed antenna 210, as described above.

Figure 4B:
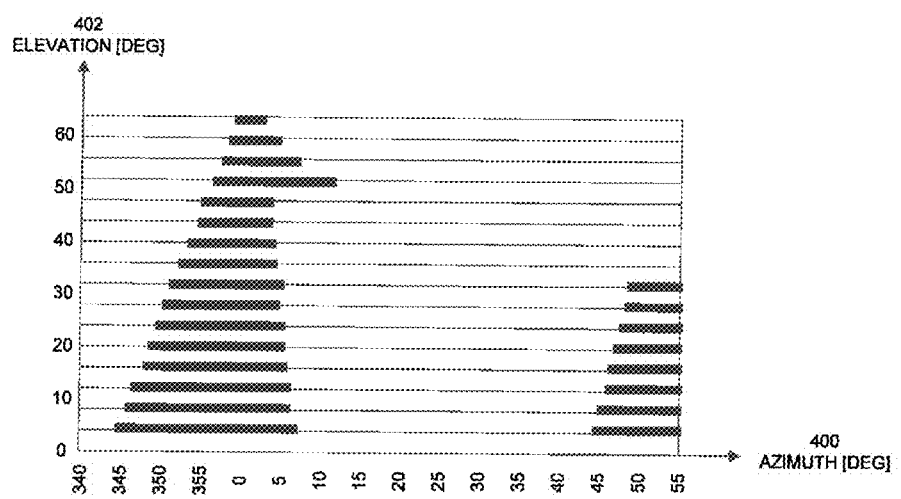
FIG. 4B, a sketch of a two dimensional (2D) map of blockage.

Refer now to FIG. 4B, a sketch of a two dimensional (2D) map of blockage. The group of points and signal strengths (collected data, or the 3D image) can be used to generate an azimuth-elevation (two dimensional, 2D) map of blockage for the installed antenna. After measuring blockage, the resulting data (map of blockage) can be used during normal antenna (antenna system 230) operation to avoid blockages. Avoiding blockages can include disabling antenna transmission when the installed antenna 210 would have to transmit toward a blockage. Avoiding blockages can also include handing-over operation from an obstructed antenna to a clear view antenna.

Figure 5:
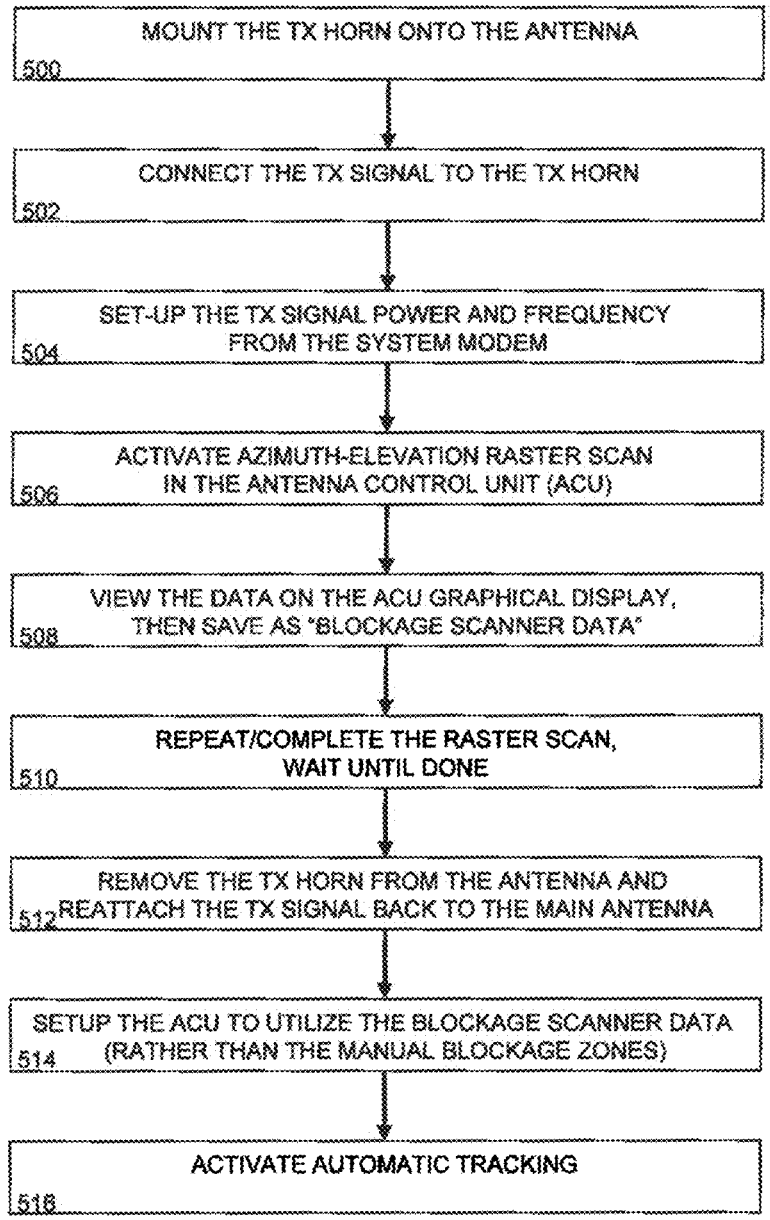
FIG. 5, an exemplary flowchart of measuring blockage.

Refer now to FIG. 5, an exemplary flowchart of measuring blockage. In this non-limiting example, a Ku-band antenna is used. In block 500, the Tx horn 200 is mounted onto the antenna system 230. In this case, the Tx horn 200 is a wide-beam horn mounted on the backside of the main antenna sub-reflector 220. In step 502, a Tx signal (from the BUC 304) is connected to the Tx horn 200.

In step 504, the Tx signal power and frequency are setup from the modem 300. In this case, the modem 300 produces a clean carrier wave signal at a frequency of 1.2 GHz. The carrier wave signal is up-converted by the BUC 304 to 14.250 GHz and transmitted on vertical polarization at 0 dBm from the Ex horn 200. Optionally, a special Tx monitoring LNB 312 can be installed in place of the regular Rx LNB. (The regular Rx LNB is not shown in the diagrams.) The Tx monitoring LNB 312 can be, for example, a Swedish Micro Wave Company (SMW) Tx Monitoring 14.0-14.5 GHz 30 dB Gain LNB. Since the emitting horn (Tx horn 200) is located in close proximity to the receiving antenna port (Rx horn 222), normally there will be some direct leakage into the Tx monitoring LNB 312. However, the transmitted test signal is of sufficiently low power (for example being just 0 dBm), the leaking signal will not saturate the Tx monitoring LNB 312.

In step 506, the (azimuth-elevation) raster scan is activated by the ACU 314. The antenna emitting the 1.2 GHz reference signal is moved systematically in a complete azimuth 360 degree scan with an elevation raster of about 5 degrees (trading off the scan duration and the measurement resolution).

In step 508, the collected data of reflected signal strength for each azimuth-elevation point can be optionally viewed on a graphical display. A sample of the transmitted signal is passed through the variable phase shifter 306, through the variable attenuator 308, and then subtracted from the Tx monitoring LNB 312 output signal. The result is part of the collected data stored as blockage scanner data.

In step 510, the collection of data continues for each point until sufficient data has been collected to determine the blockages, typically continuing until the raster scan is complete. In step 512, the Tx horn 200 can be removed (deinstalled) from the antenna system 230, and the Tx signal can be attached (returned) to feeding the Rx horn 222 for the antenna system (to feed the installed antenna 210). In step 514, the ACU 314 is setup to use the blockage scanner data (3D image or 2D map of blockage) during normal antenna operation. In step 516, the antenna begins normal operation using automatic tracking of the antenna (installed antenna 210 receiving direction 212) and the measured blockage data to avoid blockages during transmission and/or receiving from/to the installed antenna 210.

The current example is factory pre-calibrated using the variable phase-shifter 306 and the variable attenuator 308 to produce minimal signal at the output of the variable attenuator 308 when the 1.2 GHz signal is activated and the installed antenna 210 pointed towards clear sky. This will help assure that the 1.2 GHz signal direct leakage into the Tx monitoring LNB 312 is cancelled out, and that the measurements expected on the blockage scanner output are measurements (collected data) caused by signal reflections from actual obstructions. The reflected signals will have a measurable phase offset with respect to the reference signal and will therefore not be affected by the reference signal subtraction.

Note the re-use of the transmission equipment (for example the modem 300, BUC 304) is possible to implement blockage measurement.

Refer now to FIG. 7, a table of values for an exemplary power analysis. The current figure shows estimated signals in a blockage environment for a Ku-band (14.50 GHz scanning frequency) antenna system and Ka-band (31 GHz) antenna system. In both cases, Rx reflector diameter (diameter of installed antenna 210) is 2.00 m, Tx horn (Tx horn 200) aperture diameter is 0.10 m, Tx horn output power is 0.00 dBm, reflector to blockage distance is 75.0 m, and estimated blockage reflectivity is −30.00 dB. Calculated values for the Ku-band system are:

Rx reflector gain 46.65 [dBi]
Rx reflector beamwidth 0.87 [$\delta\theta°$]
Tx horn gain 20.63 [dBi]
Tx horn beamwidth 17.38 [$\delta\theta°$]
Round path loss 99.19 [dB]
Rx signal power at LNB input −61.91 [dBm]
Calculated values for the Ka-band system are:
Rx reflector gain 53.25 [dBi]
Rx reflector beamwidth 0.41 [$\delta\theta°$]
Tx horn gain 27.23 [dBi]
Tx horn beamwidth 8.13 [$\delta\theta°$]
Round path loss 105.79 [dB]
Rx signal power at LNB input −55.31 [dBm]

DETAILED DESCRIPTION—SECOND EMBODIMENT

In a case where the antenna system 230, in particular the installed antenna (main reflector) 210, has system noise temperature (T), e.g. 200 degree Kelvin, sufficiently below ambient temperature (To), commonly 300 degree Kelvin, the current embodiment can be used without Tx horn 200. In other words, using only the receiving portion of the system, absent of an active transmitter (such as Tx horn 200). Sufficient T includes the main reflector and the receiving chain containing the feed horn and the LNB (Tx monitoring LNB 312). In this case, discrimination is possible between an obstruction and clear sky background even without transmitting with the illuminative horn (Tx horn 200). In place of receiving a reflection of a test signal, the installed antenna 210 receives an incoming radiation signal from either a clear sky of commonly low temperature, e.g. 50 degree Kelvin, or of an obstruction radiation signal characterized by relatively higher Ambient Temperature, of commonly 300 degree Kelvin. The incoming signal can be received similar to the reflection of the test signal, via a raster scan of azimuth and elevation. The collected data from the raster scan of the incoming signal can be used to generate a 2D map of blockage. The 2D map, or image, may have a recorded difference between the clear sky signal and obstruction signal of 2 to 3 dB. Image processing and other known techniques can be used to process the 2D image of blockage to create a map of blockage that can then be used during normal antenna operation to avoid the measured blockages.

This current embodiment is particularly useful in existing antenna installations without the need for installing additional hardware (such as Tx horn 200).

FIG. 6 is a high-level partial block diagram of an exemplary system 600 configured to implement the ACU 314 of the present invention. System (processing system) 600 includes a processor 602 (one or more) and four exemplary memory devices: a RAM 604, a boot ROM 606, a mass storage device (hard disk) 608, and a flash memory 610, all communicating via a common bus 612. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in processor 602 including but not limited to reduced instruction set computer (RISC) architecture and/or complex instruction set computer (CISC) architecture. A module (processing module) 614 is shown on mass storage 608, but as will be obvious to one skilled in the art, could be located on any of the memory devices.

Mass storage device 608 is a non-limiting example of a non-transitory computer-readable storage medium bearing computer-readable code for implementing the blockage measurement methodology described herein. Other examples of such computer-readable storage media include read-only memories such as CDs bearing such code.

System 600 may have an operating system stored on the memory devices, the ROM may include boot code for the system, and the processor may be configured for executing the boot code to load the operating system to RAM 604, executing the operating system to copy computer-readable code to RAM 604 and execute the code.

Network connection 620 provides communications to and from system 600. Typically, a single network connection provides one or more links, including virtual connections, to other devices on local and/or remote networks. Alternatively, system 600 can include more than one network connection (not shown), each network connection providing one or more links to other devices and/or networks.

System 600 can be implemented as a server or client respectively connected through a network to a client or server.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A system for measuring blockage, comprising:
    (a) a transmitter horn (Tx horn) configured for transmitting a test signal in a transmitting direction; and
    (b) an installed antenna configured for receiving a reflection of said test signal from a receiving direction; and
    (c) an antenna control unit (ACU) configured to compare each of said respective reflections to a reference signal level, and for any of said points where said respective reflection exceeds said reference signal designating said point as having blockage,
    wherein said Tx horn's transmitting direction is directionally aligned with said receiving direction and
    wherein said transmitting and receiving is repeated in a scan of azimuth and elevation points relative to an axis of said installed antenna, each of said points having a respective reflection.

2. The system of claim 1 wherein said Tx horn has a beam width selected from the group consisting of:
    (a) at least 10 degrees;
    (b) at least 15 degrees;
    (c) at least 20 degrees; and
    (d) at least 25 degrees.

3. The system of claim 1 wherein said installed antenna has a beam width selected from the group consisting of:
    (a) less than 5 degrees;
    (b) less than 2 degrees; and
    (c) less than 1 degree.

4. The system of claim 1 wherein said Tx horn is standalone from said installed antenna and mounted substantially in said receiving direction.

5. The system of claim 1 wherein said directional alignment includes said transmitting direction being substantially parallel to and matched with the azimuth and elevation of said receiving directions.

6. The system of claim 1 wherein during said transmitting and, prior to said receiving, said installed antenna is calibrated by pointing said installed antenna towards clear sky.

7. A method for measuring blockage, comprising the steps of:
   (a) transmitting a test signal from a transmitter horn (Tx horn) in a transmitting direction;
   (b) receiving a reflection of said test signal at an installed antenna from a receiving direction; and
   (c) comparing each of said respective reflections to a reference signal level, and for any of said points where the respective reflection exceeds said reference signal designating said point as having blockage,
   wherein said transmitting direction is directionally aligned with said receiving direction, and
   wherein said transmitting and receiving is repeated in a scan of azimuth and elevation points relative to an axis of said installed antenna, each of said points having a respective reflection.

8. The method of claim 7 wherein said Tx horn is standalone from said installed antenna and mounted substantially in said receiving direction.

9. The method of claim 7 wherein said directional alignment includes said transmitting direction being substantially parallel to and matched with the azimuth and elevation of said receiving directions.

10. The method of claim 7 wherein during said transmitting and prior to said receiving, said installed antenna is calibrated by pointing said installed antenna towards clear sky.

11. A method for measuring blockage, comprising the steps of:
    (a) receiving an incoming signal at, an installed antenna, said incoming signal selected from the group consisting of:
       (i) a clear sky signal; and
       (ii) an obstruction signal,
    (b) repeating said receiving in a scan of azimuth and elevation points, each of said points having a respective incoming signal power level;
    (c) generating, using said power levels, a map of received power; and
    (d) extracting features from said map of received power, wherein said extracting includes designating points where said power level is less than a provided power level as points having blockage.

12. The method of claim 11 further including the step of: prior to said extracting, normalizing said map.

13. The method of 11 wherein said extracting is performed using at least one image processing technique.

14. A non-transitory computer-readable storage medium having embedded thereon computer-readable code for measuring blockage, the computer-readable code comprising program code for:
    (a) transmitting a test signal from a transmitter horn (TX horn) in a transmitting direction;
    (b) receiving a reflection of said test signal at an installed antenna from a receiving direction; and
    (c) comparing each of said respective reflections to a reference signal level, and for any of said points where said respective reflection exceeds said reference signal designating said point as having blockage,
    wherein said transmitting direction is directionally aligned with said receiving direction, and
    wherein said transmitting and receiving is repeated in a scan of azimuth and elevation points relative to an axis of said installed antenna, each of, said points having a respective reflection.

15. A non-transitory computer-readable storage medium having embedded thereon computer-readable code for measuring blockage, the computer-readable code comprising program code for:
    (a) receiving an incoming signal at an installed antenna, said, incoming signal selected from the group consisting of:
       (i) a clear sky signal; and
       (ii) an obstruction signal,
    (b) repeating said receiving in a scan of azimuth and elevation points, each of said points having a respective incoming signal power level;
    (c) generating, using said power levels, a map of received power; and
    (d) extracting features from said map of received power, wherein said extracting includes designating points where said power level is less than a provided power level as points having blockage.

* * * * *

UNITED STATES PATENT AND TRADEMARK OFFICE
CERTIFICATE OF CORRECTION

PATENT NO. : 9,960,861 B2  
APPLICATION NO. : 15/011686  
DATED : May 1, 2018  
INVENTOR(S) : Azriel Yakubovitch Page 1 of 1

It is certified that error appears in the above-identified patent and that said Letters Patent is hereby corrected as shown below:

Claim 1, Column 10, Line 42 should be corrected as follows:  
Change "A TRANSMITTER BORN (TX BORN) CONFIGURED"  
To --A TRANSMITTER HORN (TX HORN) CONFIGURED--

Signed and Sealed this  
Nineteenth Day of June, 2018

Andrei Iancu  
*Director of the United States Patent and Trademark Office*